Figure 1:
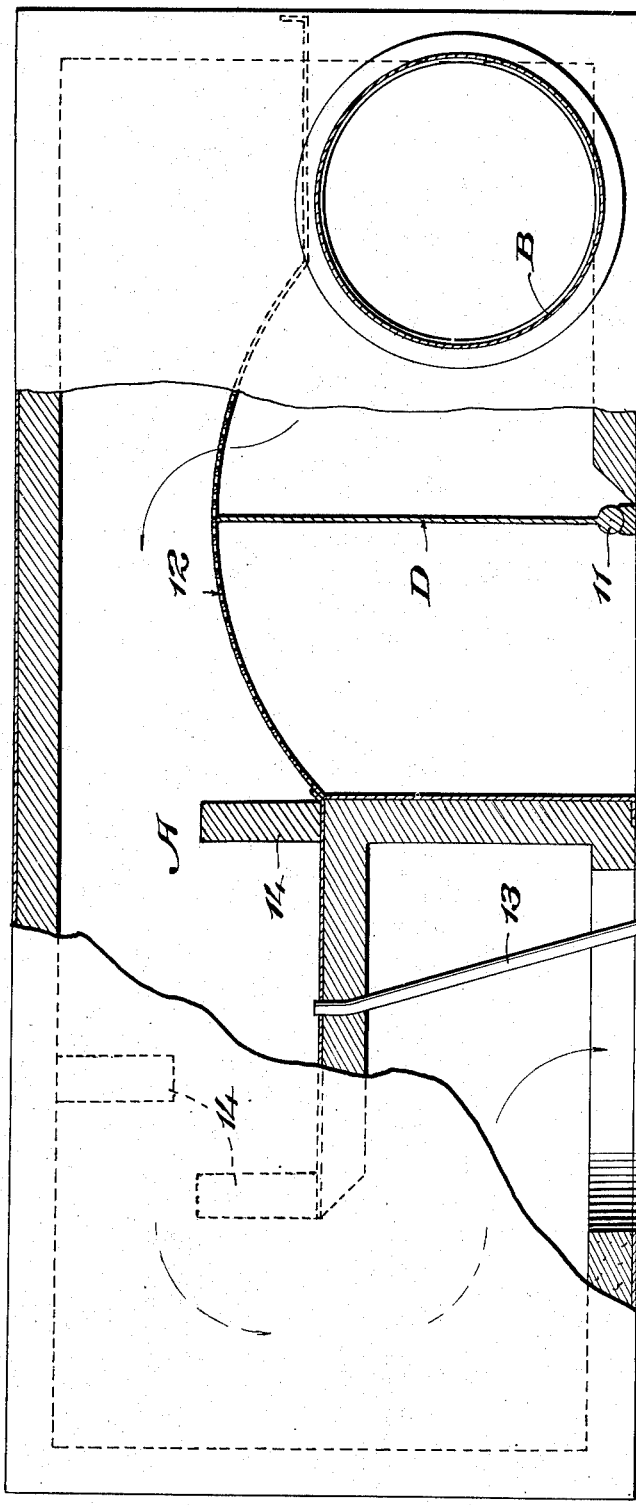

Aug. 24, 1954     L. R. PHILLIPS     2,687,076
VENTILATING APPARATUS

Filed Nov. 24, 1952                                         2 Sheets-Sheet 1

INVENTOR
Leonard R. Phillips,
BY
Carroll Bailey
ATTORNEY

Aug. 24, 1954 L. R. PHILLIPS 2,687,076
VENTILATING APPARATUS
Filed Nov. 24, 1952 2 Sheets-Sheet 2
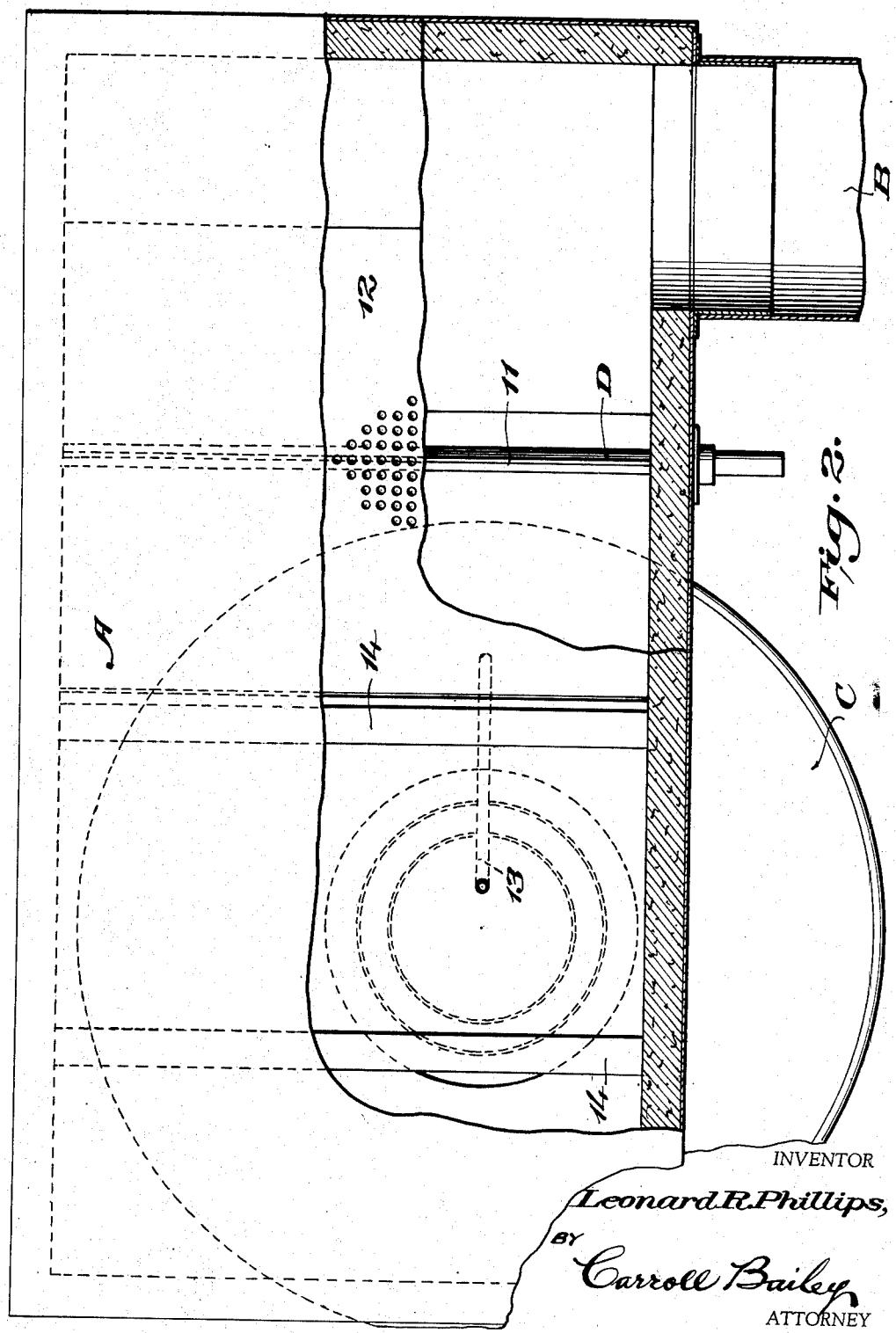
INVENTOR
Leonard R. Phillips,
BY
Carroll Bailey
ATTORNEY Patented Aug. 24, 1954

2,687,076

UNITED STATES PATENT OFFICE 2,687,076

VENTILATING APPARATUS

Leonard R. Phillips, East Hartford, Conn., assignor to Anemostat Corporation of America, New York, N. Y., a corporation of Delaware Application November 24, 1952, Serial No. 322,263

2 Claims. (Cl. 98—41)

This invention relates to ventilating apparatus, and is particularly concerned with the provision of means to facilitate regulation of flow of air from an air supply duct to and through air outlet devices into enclosures.

In any given ventilating system it is desirable, for most satisfactory and economical operation of the system, to have just the proper total amount of air supplied to all of the air outlet devices of the system to satisfy their collective requirements. Further than this, however, it not only is desirable but necessary to regulate carefully and accurately the rate of flow through each separate outlet device in order properly to balance the system; i. e., to insure that each outlet device may have just the right predetermined proportionate amount of air supplied thereto to suit its requirements. To this end and in accordance with the invention, each outlet device in any given system has suitably associated therewith an individual thereto suitable valve means for regulating the rate of flow of air therethrough.

Most air outlet devices involve constructions such that the air flowing from them has various different velocities at various different locations. Therefore, it is difficult, by the use of any known type of air flow measuring instrument, to ascertain with any degree of accuracy the rate of flow of air from an air outlet device by measuring the velocity of the air flowing from the device, either at a single point or by striking an average from velocity measurements taken at various different points.

In a ventilating system there is a definite relationship between the rate of flow of air through any given outlet device and the static pressure of the air between the outlet device and its associated regulating valve. In other words, for each different rate of flow of air through an outlet device there exists between the device and its regulating valve a certain definite static pressure. Hence, the static pressure existing between any given air outlet device and its regulating valve constitutes a measure for adjustment of the valve to obtain a desired rate of flow of air through the outlet device.

It is, however, difficult and practically impossible, by the use of any known type of air pressure measuring instrument, to ascertain the static pressure between air outlet devices of certain kinds and their associated regulatng valves. For example, a common and widely used type of air outlet device comprises a plurality of successively smaller, open-ended, hollow, flaring members spaced successively inwardly of one another to divide the supplied air into a plurality of separate streams and to deflect the streams more or less laterally outward, whereby the air is diffused. In such outlet devices and others of a generally similar nature there usually is not sufficient space between the flaring members to permit the insertion therethrough into the space behind the device of any known static pressure measuring means to ascertain the static pressure of the air between the outlet device and its associated regulating valve.

Accordingly, the object of the present invention is to provide simple, practical means whereby commercially known static pressure measuring means may readily be employed to ascertain the static pressure of the air in the space between an air outlet device and its regulating valve, thus to enable adjustment of the valve to insure just the proper rate of flow of air through the outlet device to satisfy its known requirements.

More particularly, the invention resides in associating with an air outlet device an open-ended tube one end of which is located in the space between the air outlet device and its regulating valve and the other end of which is exposed where it is readily accessible for engagement by an appropriate element of a static pressure measuring device. Through said tube the static pressure of the air in the space between the outlet device and its regulating valve may readily be ascertained.

To regulate the outlets of any given system, the total amount of air (C. F. M.) required for all of the outlets of the system first is ascertained and the supply of air then is regulated to furnish the total amount of air (C. F. M.) required. The valves of the separate outlets then are regulated to satisfy the air requirements of the individual outlets and to balance the system.

As aforesaid, a certain definite static pressure will exist between any given outlet device and its associated regulating valve for each different rate of flow of air through the outlet device. In this connection, for various different rates of flow of air through any given air outlet device, the various different corresponding static pressures between the device and its regulating valve may be ascertained in any suitable manner, as by laboratory tests. Hence, following regulation of the air supply of any given system to furnish just the proper rate of flow of air required to satisfy the requirements of all of the outlets of the system, proper adjustments of the valves of the different outlets to cause proper rates of flow of air through the different outlets to satisfy their known individual requirements and to balance the system may readily be effected simply by utilizing the static pressures between the devices and their associated valves as measures for adjustments of the valves to obtain the required rates of flow of air through the individual outlet devices.

The invention consists in the novel combination and arrangement of parts as are illustrated by way of example in the accompanying drawings and as will be hereinafter more fully described and claimed.

In the accompanying drawings:

Figs. 1 and 2 are a vertical, longitudinal section and a horizontal section, respectively, through an air outlet unit embodying the features of the invention.

Referring to the drawings in detail, A designates a plenum chamber, B designates a duct connected to said plenum chamber for supplying air thereto, and C designates an air outlet device connected to said plenum chamber and through which air is delivered from said chamber into a room or other enclosure.

The plenum chamber A may be of any suitable size, shape, dimensions and construction. Likewise, the air outlet device C may be of any desired size and type. As illustrated in the drawings said device is of the type comprising a plurality of successively smaller, open-ended, hollow, flaring members 10 spaced successively inwardly of one another whereby they serve to divide air flowing through the device into a plurality of separate streams and to deflect the streams laterally outward, thus causing the air to be delivered from the device in diffused form.

The air supply duct B and the air outlet device C are connected to the plenum chamber A at suitably spaced apart locations, and within said plenum chamber, between said locations, is a valve D of any suitable type for regulating flow of air through said chamber from said duct to said air outlet device. As illustrated by way of example in the drawings, the valve D is in the form of a plate mounted upon a shaft 11 which is suitably journaled in the plenum chamber A. Thus, by rotatably adjusting said shaft, said valve may be swingably adjusted. Any suitable valve adjusting means may be engaged with an end portion of the shaft 11 which extends exteriorly of the plenum chamber A. At its free edge the valve plate cooperates with an arcuate, perforated plate or partition element 12 to regulate flow of air from the duct B to the air outlet device C, the perforations in the plate or partition element 12 serving to distribute the supplied air more or less uniformly in the portion of the plenum chamber between said plate or partition element 12 and the air outlet device C.

In planning a ventilating system the number of outlet devices required, their locations and their individual air requirements are predetermined. When the system is installed it is regulated to furnish the total volume of air (C. F. M.) required by all of the outlets. It then is necessary to adjust the valves of the individual outlets so that each outlet will have delivered therethrough just the proper predetermined proportionate amount of the total volume of air to suit its requirements and to balance the system.

Most air outlet devices are so constructed as to prevent the insertion through them into the space behind them of any known means for measuring static pressure. Therefore, in accordance with the present invention, an open-ended tube 13 is suitably mounted so that one end of the same is disposed at a suitable location in the space between the valve D and the air outlet device C and the other end thereof is exposed at some suitable point where it is readily accessible by a static pressure measuring means. Through said tube the static pressure in the space between the valve D and the air outlet device C may readily be measured by known types of static pressure measuring instruments. Therefore, all that is required in accordance with the invention to regulate the various different air outlet devices of a system so that each outlet will have delivered therethrough a proper predetermined rate of flow of air to satisfy its requirements and to balance the system, is to measure through the tube 13 of each outlet the static pressure between the outlet and its regulating valve and to adjust the valve until the static pressure is of a value corresponding to the required rate of flow of air through the device. The final result will be that the total predetermined amount of air delivered through the system during any given period of time will be apportioned in proper predetermined amounts to the separate outlets and the system will be balanced.

If the air outlet devices to be regulated are of the type illustrated and described, the exposed end of the tube 13 may conveniently be located between any two of the flaring members 10 where it is readily accessible and yet substantially concealed from view. In any event, the exposed end of said tube preferably is located in proximity to the valve shaft 12, or to the means for adjusting the valve D, so that one may readily take static pressure measurements while adjusting said valve.

In some instances it may be desirable to provide in the space between an air outlet device and its regulating valve some means to impede flow of air supplied to the device in order to insure the building up in said space of a readily measurable static pressure. Such means may be of any suitable form and is illustrated in the drawing as comprising baffle elements 14 against which the air impinges and by which its velocity is reduced.

While only a single, specific embodiment of the invention has been illustrated and described, it will be understood that the same may have various other specifically different embodiments within its spirit and scope as defined in the appended claims.

I claim:

1. In a ventilating system including a plurality of air outlet devices and means for supplying to said devices a rate of flow of air approximately equal to their collective rate of flow requirements, an adjustable valve in said air supply means individual to and behind and spaced from each device for regulating the rate of flow of air therethrough, the static pressure in the space between each device and its associated regulating valve being different and definite for each different rate of flow of air through the device and thereby being a measure of the rate of flow of air through the device, and means to enable the static pressure in the space between each device and its associated regulating valve to be readily ascertained for use as a guide in adjusting the valves of the different devices to regulate the rates of flow of the air therethrough to approximate their exact individual requirements and thereby to balance the system, said latter means comprising an open-ended tube in each device having one end thereof located in the space between the device and its related regulating valve and its other end exposed at a point where it is readily accessible for application thereto of a static pressure measuring instrument.

2. In a ventilating system including a plurality of air outlet devices and means for supplying to said devices a rate of flow of air approximately equal to their collective rate of flow requirements, a plenum chamber individual to and behind each air outlet device through which air is supplied to the device, an adjustable valve individual to each plenum chamber for regulating flow of air thereto, the static pressure in each plenum chamber between the related valve and the related air outlet device being different and definite for each different rate of flow of air through said chamber and its related air outlet device, and means to enable the static pressure in each plenum chamber between the related valve and the related air outlet device to be readily ascertained for use as a guide to enable the valves of the different devices to be readily adjusted to regulate the rates of flow of the air through the different devices to approximate their exact individual requirements and thereby to balance the system, said latter means comprising an open-ended tube individual to each plenum chamber having one end thereof located in the plenum chamber between the related valve and the related air outlet device and its other end exposed at a point where it is readily accessible for application thereto of a static pressure measuring instrument.

References Cited in the file of this patent

UNITED STATES PATENTS

| Number | Name | Date |
|---|---|---|
| 1,138,470 | Hackney | May 4, 1915 |
| 1,697,344 | Campbell | Jan. 1, 1929 |
| 2,105,017 | Suffron | Jan. 11, 1938 |
| 2,109,512 | Stacey, Jr. | Mar. 1, 1938 |
| 2,157,135 | Little et al. | May 9, 1939 |
| 2,191,141 | Grant | Feb. 20, 1940 |
| 2,246,338 | Ashley | June 17, 1941 |
| 2,259,780 | Seid | Oct. 21, 1941 |
| 2,314,569 | Baker | Mar. 23, 1943 |
| 2,403,291 | Kurth | July 2, 1946 |
| 2,564,272 | Morton | Aug. 14, 1951 |